United States Patent
Duluk, Jr.

(10) Patent No.: US 8,749,562 B1
(45) Date of Patent: Jun. 10, 2014

(54) SHARING BINDING GROUPS BETWEEN SHADERS

(75) Inventor: Jerome F. Duluk, Jr., Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1094 days.

(21) Appl. No.: 12/565,466

(22) Filed: Sep. 23, 2009

(51) Int. Cl.
*G06T 1/00* (2006.01)
*G06F 13/00* (2006.01)

(52) U.S. Cl.
USPC .......................... 345/522; 345/536; 345/537

(58) Field of Classification Search
None
See application file for complete search history.

(56) References Cited

U.S. PATENT DOCUMENTS

2008/0001952 A1*  1/2008  Srinivasan et al. ............ 345/502

* cited by examiner

*Primary Examiner* — Kee N Tung
*Assistant Examiner* — Leon T Cain, II
(74) *Attorney, Agent, or Firm* — Patterson & Sheridan, LLP

(57) ABSTRACT

A system and method for sharing binding groups between shaders allows for efficient use of shader state data storage resources. In contrast with conventional graphics processors and Application Programming Interfaces that specify a set of binding points for each shader that are exclusive to that shader, two or more shaders may reference the same binding group that includes multiple binding points. As the number and variety of different shaders increases, the number of binding groups may increase at a slower rate since some binding groups may be shared between different shaders.

20 Claims, 8 Drawing Sheets

SHARING BINDING GROUPS BETWEEN SHADERS

BACKGROUND OF THE INVENTION

1. Field of the Invention

The present invention generally relates to binding groups that store shader state data and more specifically to sharing binding groups between shader programs.

2. Description of the Related Art

In conventional graphics systems a binding point that references shader state data used to process graphics data is defined and referenced by each shader program. Specifically, there is a one-to-one pairing between binding points and shader programs. In current systems a limited number of binding points are available for use by shaders since the shader state data occupies a significant amount of memory. As the number of shaders increases, the amount of memory needed to store the shader state data referenced by each binding point also increases as does the memory bandwidth that is consumed to access the shader state data.

Accordingly, what is needed in the art is a system and method for sharing binding points between two or more shaders.

SUMMARY OF THE INVENTION

A system and method for sharing binding points organized in binding groups between shaders allows for efficient use of shader state data storage resources. In contrast with conventional graphics processors and Application Programming Interfaces that specify a collection of binding points for each shader, two or more shaders may reference the same binding points that are organized as a binding group. As the number and variety of different shaders increases, the number of binding groups may increase at a slower rate since some binding groups may be shared between different shaders. When one or more binding points in a binding group are changed, the changed binding point(s) is seen by all shaders that reference the binding group.

Various embodiments of a method of the invention for sharing binding groups include generating a first binding group of shader state data and configuring a first shader program to reference the first binding group. A second shader program is also configured to reference the first binding group and graphics data is processed by executing the first shader program and the second shader program to produce processed graphics data that is stored in a memory or displayed on a display device.

Various embodiments of the invention include a system for sharing binding groups. The system includes a processor that is configured to generate a first binding group of shader state data and configure a first shader program to reference the first binding group. A second shader program is also configured to reference the first binding group and graphics data is processed by executing the first shader program and the second shader program to produce processed graphics data that is stored in a memory or displayed on a display device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
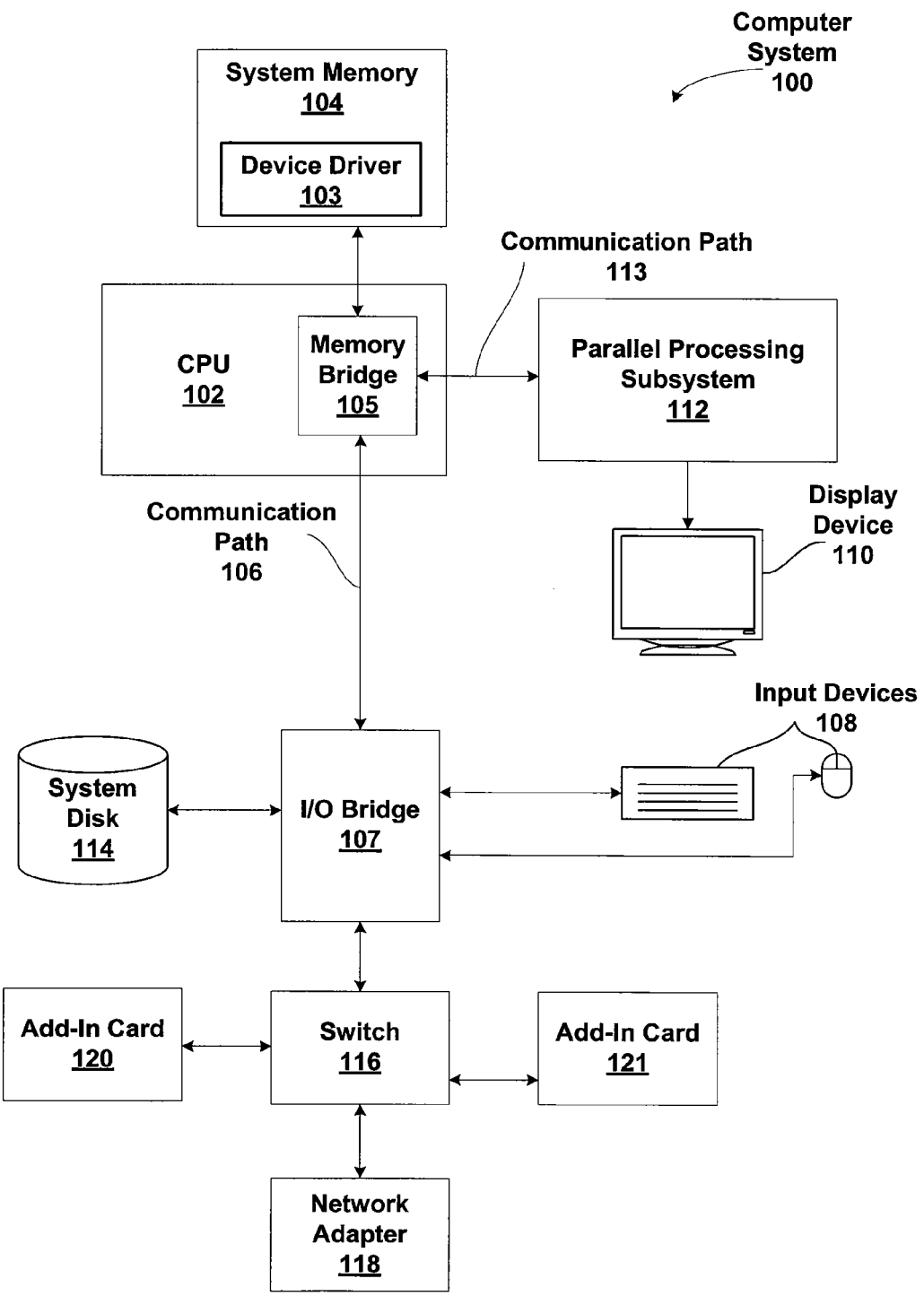
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
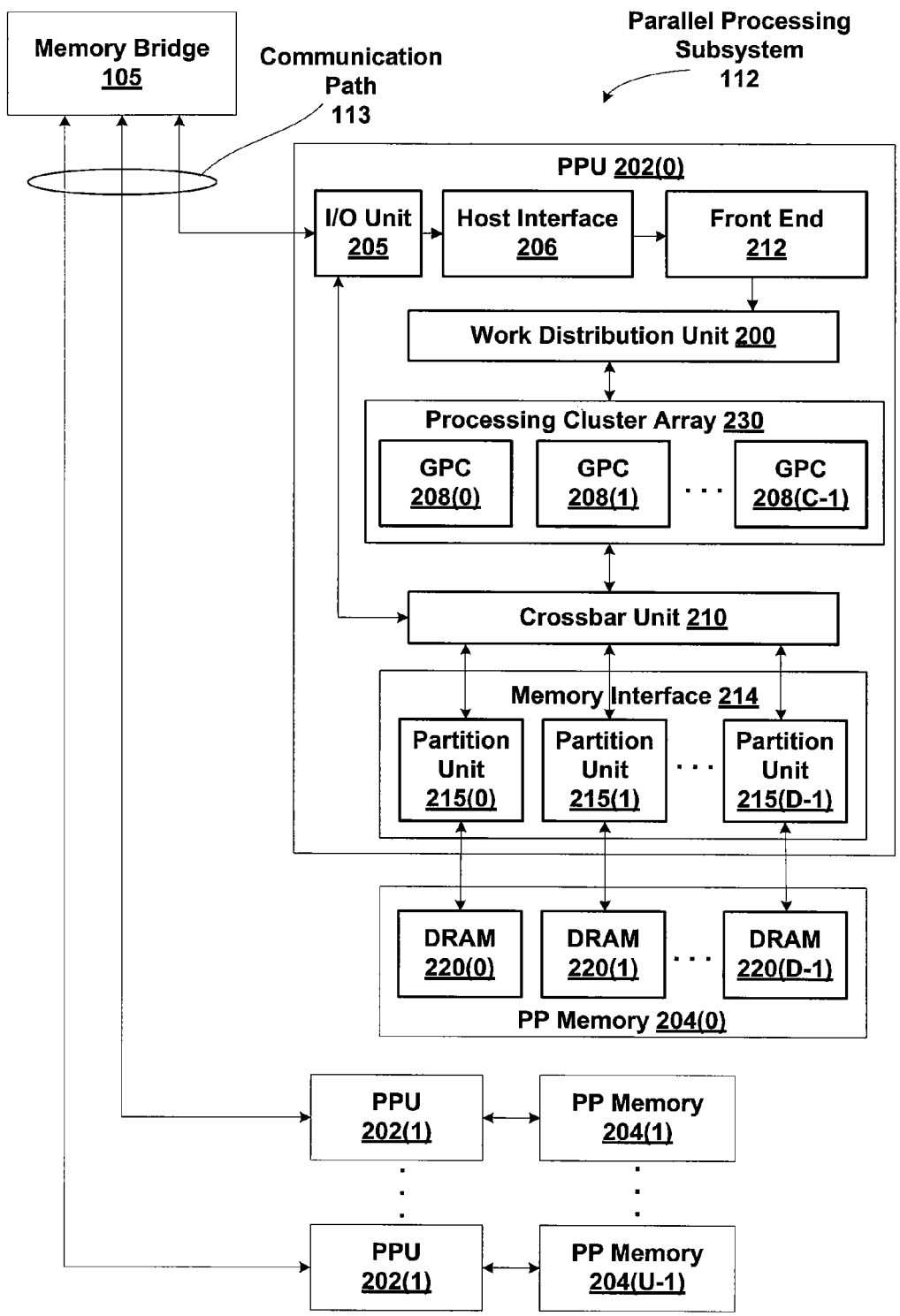
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 215 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
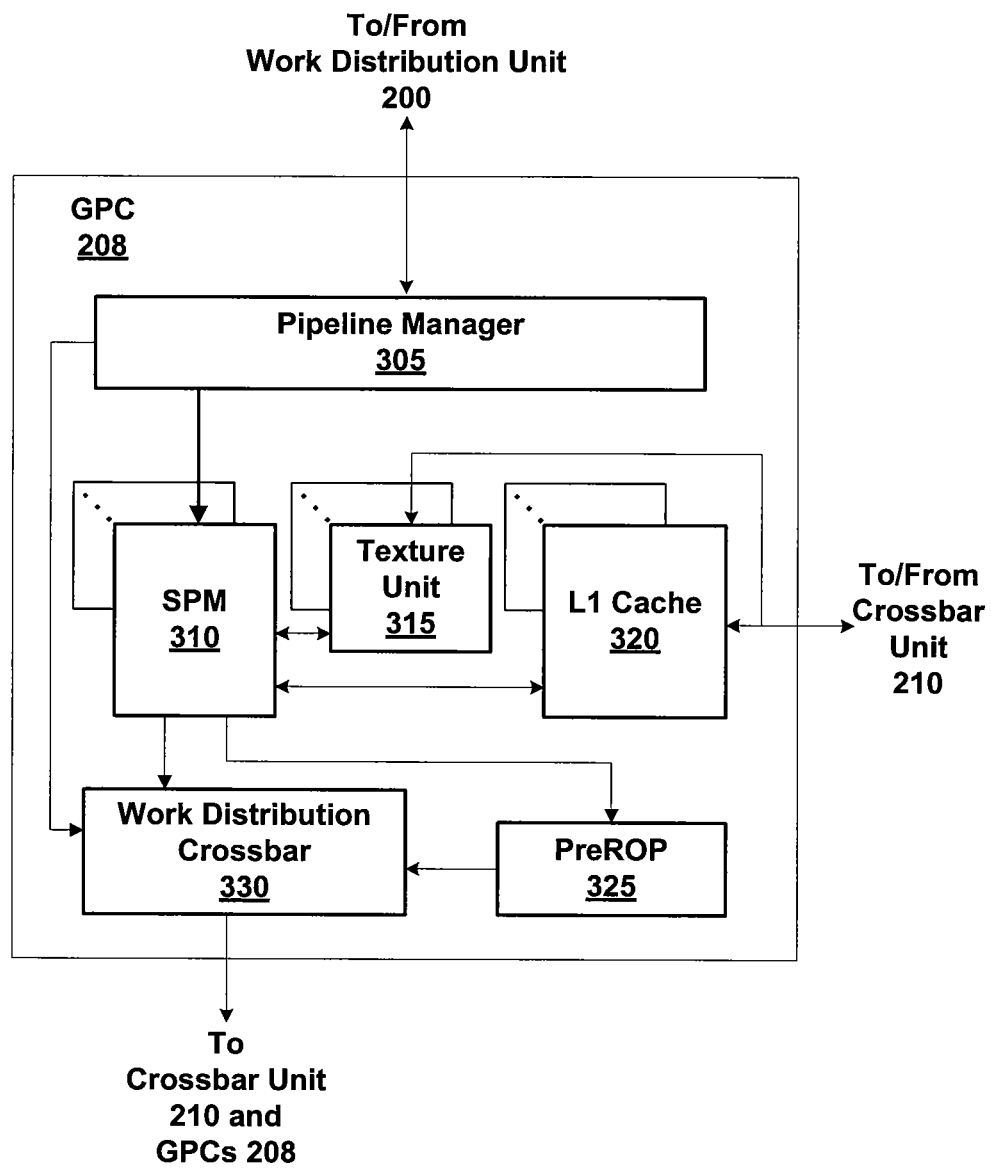
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

In one embodiment, each GPC 208 includes a number M of SPMs 310, where each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

A binding group is configured to store shader state information that is specific to a particular shader program and is used to process the graphics data. Examples of shader state information include texture headers, texture samplers, and constant buffers. Texture headers each identify a particular texture map, texture map dimensions, mipmap levels, texel format, and the like. Texture samplers each specify sampling modes that are used to access and filter the texture data, such as a multisample pattern, bi-linear, tri-linear, and the like. The constant buffers are sets of constant values. A pointer to a binding group may be stored in a GPC 208 and the shader state information may be stored in one or more of the L1 cache 320, the L2 cache, parallel processing memory 204, or system memory 104.

It will be appreciated that the core architecture described herein is illustrative and that variations and modifications are possible. Any number of processing engines, e.g., primitive engines 304, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
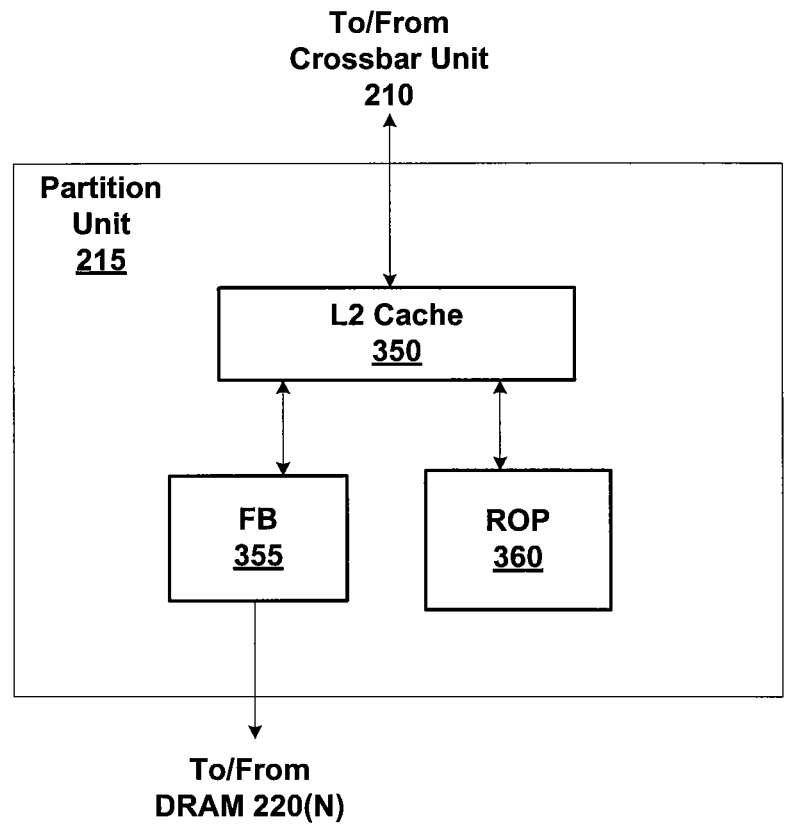
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with DRAM 220(N), outputting read and write requests and receiving data read from DRAM 220(N).

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
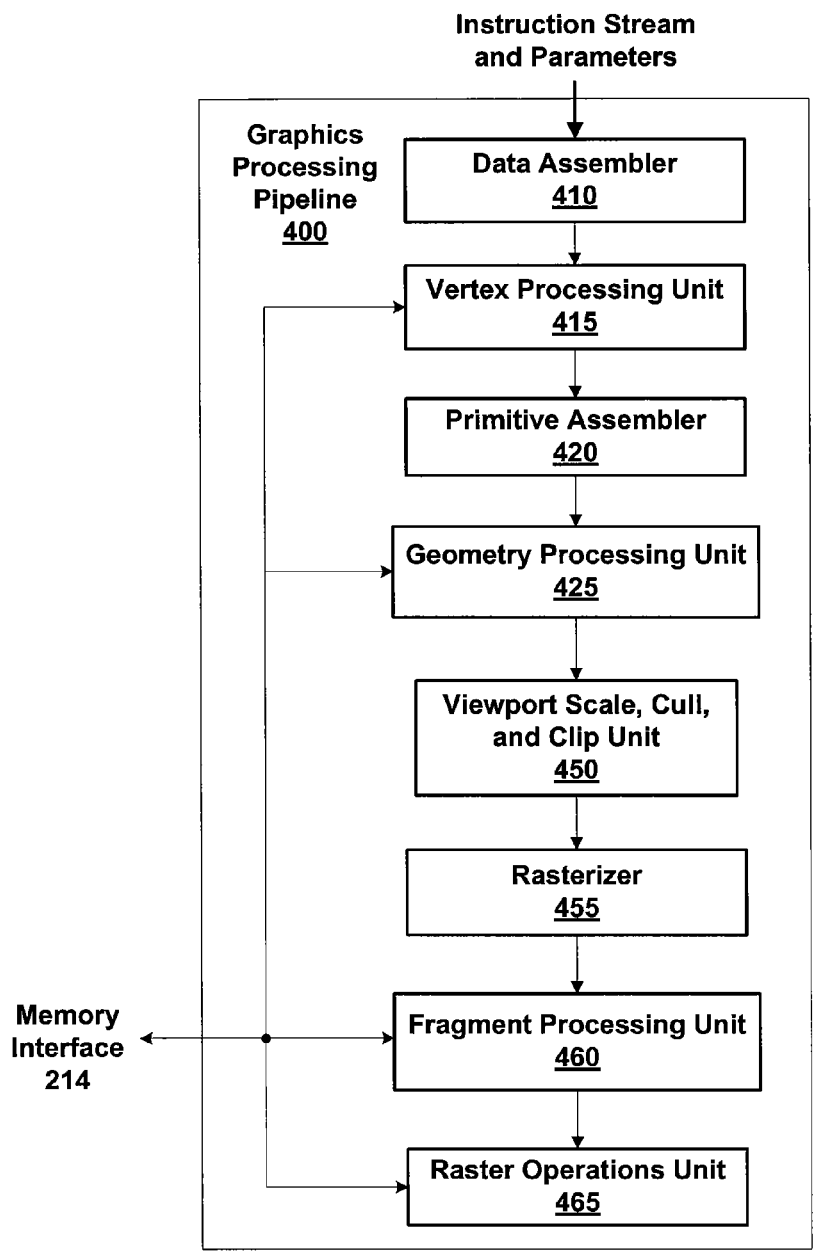
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460 to execute a vertex shader program, a geometry shader program, and a fragment shader program, respectively. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Each shader program uses many bind points for various binding state information that is used by the shader program, e.g., textures, samplers, and constant buffers. The binding state information constitutes a large amount of data associated with each shader program. Setting and maintaining the binding state information consumes memory resources and memory bandwidth. In conventional systems a limited number of binding points are available and are not shared between shaders. When two shaders need to use one binding point a copy of the binding point is defined, stored and maintained so that each of the two shaders has a separate version of the binding point. Consequently, changes to the binding point must be made to both versions of the binding point. In contrast with the conventional approach, the binding points are organized into binding groups and two or more shader programs may share a binding group, i.e., set of binding points. As the number of different shader programs increases due to changes in the Application Programming Interface, the number of binding groups may increase at a slower rate since a binding group may be shared between two or more shader programs. It is advantageous to have shader programs share a binding group compared with having each shader reference one or more separate, possibly identical binding points.

Sharing a Binding Group Between Shaders

Figure 5A:
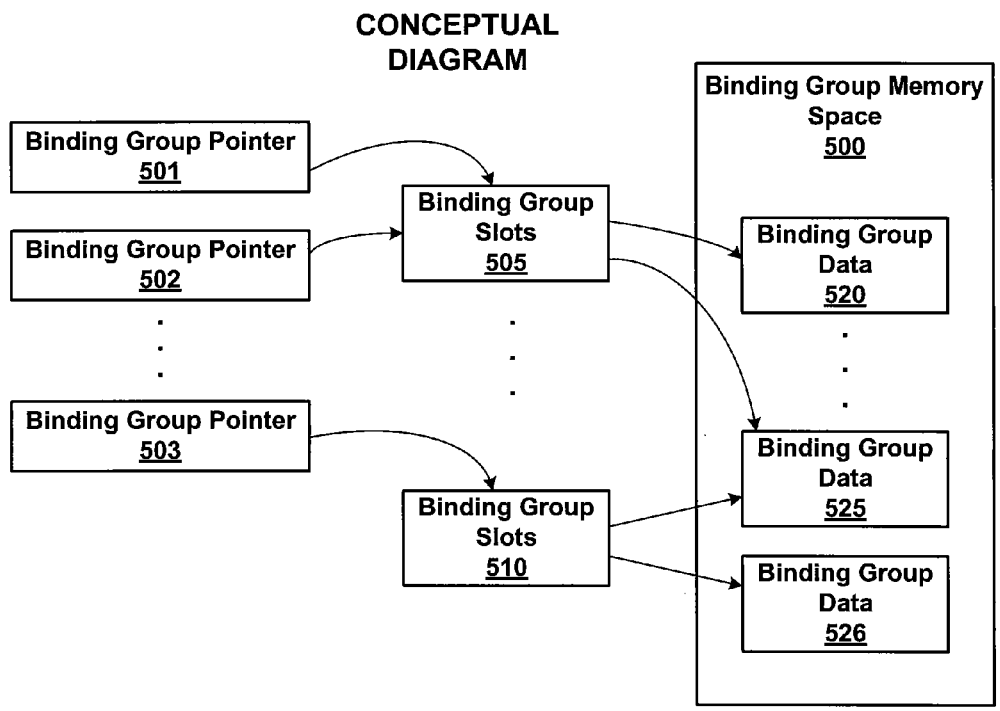
FIG. 5A is a conceptual diagram of the relationship between the binding group pointer, slots and shader state data, according to one embodiment of the present invention.

FIG. 5A is a conceptual diagram illustrating the relationship between the binding group pointer, slots and shader state data, according to one embodiment of the present invention.

Each shader program references a binding group pointer that points to a single binding group. A binding group pointer 501 and a binding group pointer 502 both point to a binding group slots 505. A binding group pointer 503 points to a binding group slots 510 and may be stored in each GPC 208 in order to configure the GPC 208 to execute a shader program using a set of state information. The binding group slots 505 and binding group slots 510 include a set of slots that each stores a pointer to binding group data that represents a set of state information and is stored in a portion of memory allocated to store the binding group data, binding group memory space 500. A first slot of binding group slots 505 stores a pointer to a binding group data 520 and a second slot of binding group slots 505 stores a pointer to a binding group data 525. A first slot of binding group slots 510 stores a pointer to the binding group data 525 and a second slot of binding group slots 510 stores a pointer to a binding group data 526. The binding group data 525 may be stored in a cache within the GPC 208 while the GPC 208 executes the shader program that references the binding group data 525. Similarly, the binding group data 526 may be stored in a cache within the GPC 208 while the GPC 208 executes the shader program that references the binding group data 526.

Figure 5B:
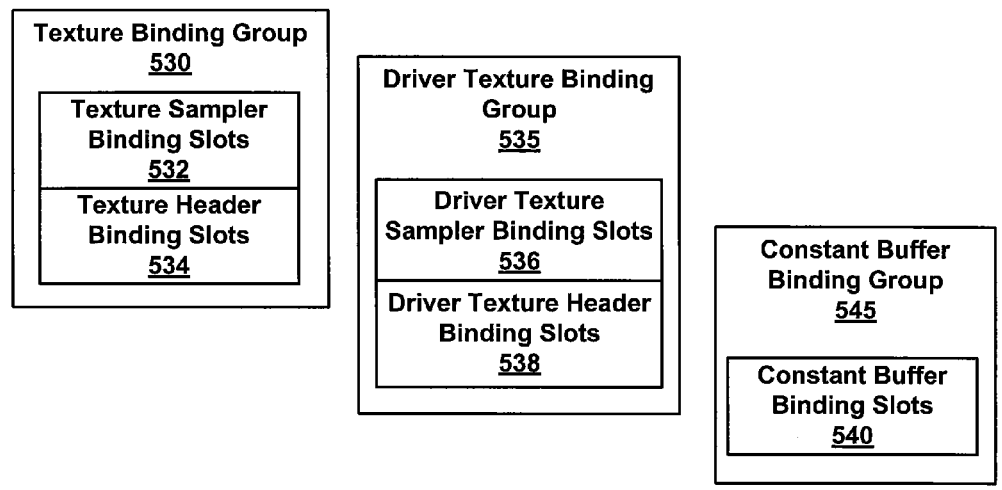
FIG. 5B is a diagram illustrating the organization of the binding group slots and binding groups, according to one embodiment of the present invention.

FIG. 5B is a diagram illustrating the organization of different binding groups, according to one embodiment of the present invention. Each of a texture binding group 530, a driver texture binding group 535, and a constant buffer binding group 545 includes multiple slots that each store a pointer to binding group data representing state information used by one or more shader programs. The texture binding group 530 includes a first number of texture sampler binding slots 532 that store pointers to texture sampler data. The texture binding group 530 includes a first number of texture header binding slots 534 that store pointers to texture header data. The driver texture binding group 535 includes a first number of driver texture sampler binding slots 536 that store pointers to texture sampler data that may be read and written only by the device driver 103 (not by through the Application Programming Interface). The driver texture binding group 535 includes a first number of driver texture header binding slots 538 that store pointers to texture header data that may be read and written only by the device driver 103 (not by through the API). The constant buffer binding group 545 includes a first number of constant buffer binding slots 540 that store pointers to constant buffer data. Some embodiments have one type of binding group that includes all the different bindings 532, 534, 536, 538, and 540.

Figure 5C:
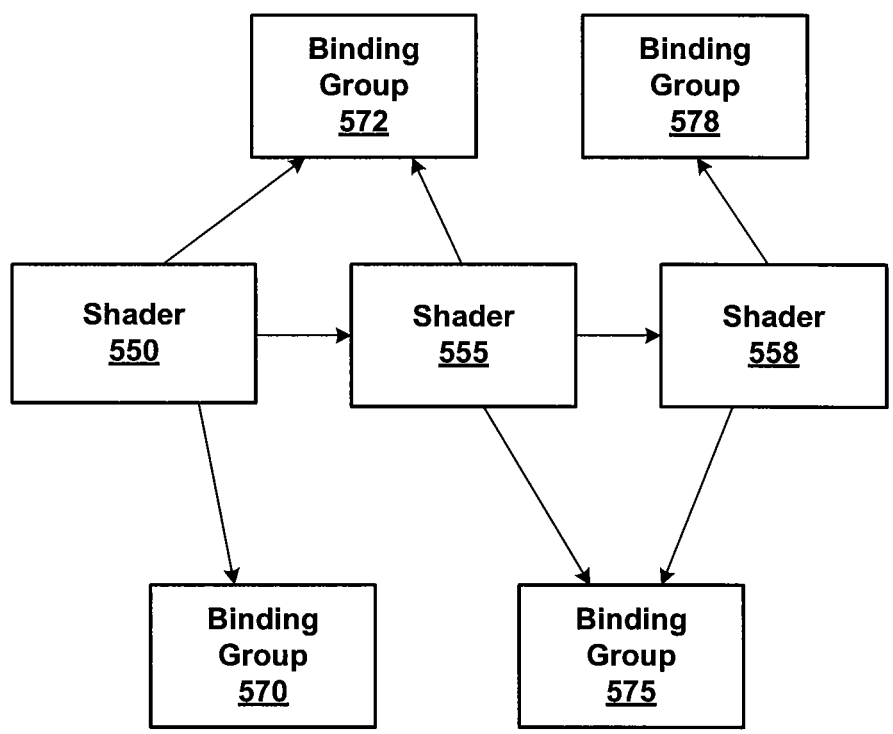
FIG. 5C is a conceptual diagram showing different shaders that reference binding groups, according to one embodiment of the present invention.

FIG. 5C is a conceptual diagram showing different shader programs that may be executed in sequence, where each shader references one or more binding groups, according to one embodiment of the present invention. A shader program 550 and 555 share a binding group 572 by each referencing the binding group 572. A shader 555 references a different binding group, binding group 575 that is shared with a shader 558. The shader 550 also references a binding group 570 and the shader 558 also reference a binding group 578. Each one of the binding groups may be any type of binding group, e.g., texture, driver texture, constant buffer, and the like.

In contrast with a conventional graphics processor and/or Application Programming Interface, as the number and/or variety of shader programs increases, the number of binding groups does not increase to maintain a one-to-one correspondence between shader programs and binding groups. Instead, multiple shader programs may reference the same binding group.

An Application Programming Interface may be used to set a pointer to the binding group. In some cases, the number of binding groups may be limited by the amount of storage provided within a particular graphics processor. A pointer to a texture sampler binding slot is set for a binding group using the code shown in TABLE 1. The number of texture sampler binding slots is set by SetBindingControl[].Texture.MaxActiveSamplers and each texture sampler binding slot specifies one of a maximum of number of texture samplers, where the maximum number of texture samplers is set by SetTexSamplerPoolC.MaximumIndex.

TABLE 1

```
method TextureSampler action {
    field Valid TYPEDEF_1BIT_FALSE_TRUE;
    field SamplerSlot U08;
    field Index U13;
    if ( SamplerSlot > MAX_SAMPLER_SLOT )
        throw ErrorInvalidValue;
    if ( ((U20)Index) > SetTexSamplerPoolC.MaximumIndex )
        throw ErrorInvalidValue;
};
```

The actual binding operation is performed by storing the value from a field index into the sampler binding table for the binding group_mgi (method group index) at the location specified by the field SamplerSlot. The field Index is relative to the base address set by the SetTexSamplerPool methods, and all shaders share this space of indices. Field Valid indicates whether the SamplerSlot is bound. When Valid is TRUE, the specified SamplerSlot is bound to the Index'ed sampler in the TexSamplerPool. When Valid is FALSE, the specified SamplerSlot is unbound A pointer to a texture header binding slot is set for a binding group using the code shown in TABLE 2. The maximum number of texture header binding slots is set by SetBindingControl[].Texture.MaxActiveHeaders and each texture header binding slot specifies one of a maximum of number of texture headers, where the maximum number of texture headers is set by SetTexHeaderPoolC.MaximumIndex.

TABLE 2

```
method TextureHeader action {
    field Valid TYPEDEF_1BIT_FALSE_TRUE;
    field TextureSlot U08;
    field Index U22;
    if( TextureSlot > MAX_TEXTURE_SLOT )
        throw ErrorInvalidValue;
    if( Index > SetTexHeaderPoolC.MaximumIndex )
        throw ErrorInvalidValue;
};
```

A pointer to a driver private texture sampler binding slot is set for a binding group using the code shown in TABLE 3.

TABLE 3

```
method ExtraTextureSampler action {
    field Valid TYPEDEF_1BIT_FALSE_TRUE;
    field SamplerSlot U08;
    field Index U13;
    if ( SamplerSlot > MAX_EXTRA_SAMPLER_SLOT )
        throw ErrorInvalidValue;
    if ( ((U20)Index) > SetTexSamplerPoolC.MaximumIndex )
        throw ErrorInvalidValue;
};
```

A pointer to a driver private texture header binding slot is set for a binding group using the code shown in TABLE 4.

TABLE 4

```
method ExtraTextureHeader action {
    field Valid TYPEDEF_1BIT_FALSE_TRUE;
    field TextureSlot U08;
    field Index U22;
    if( TextureSlot > MAX_EXTRA_TEXTURE_SLOT )
        throw ErrorInvalidValue;
    if( Index > SetTexHeaderPoolC.MaximumIndex )
        throw ErrorInvalidValue;
};
```

A pointer to a constant buffer binding slot is set for a binding group using the code shown in TABLE 5. The constant buffer table is stored and managed by each GPC 208.

TABLE 5

```
method ConstantBuffer action {
    field Valid TYPEDEF_1BIT_FALSE_TRUE;
    field ShaderSlot U05;
    if (ShaderSlot > MAX_CONSTANT_BUFFER_SHADER_SLOT )
        throw ErrorInvalidValue;
    if ((Valid == TRUE) && (constant_buffer_selected == FALSE)) throw
        ErrorInvalidOperation;
};
```

To cause a bind to occur, field Valid must be set to TRUE, and field ShaderSlot selects one of the binding slots. The constant buffer selected by the SetConstantBufferSelector [ABC] methods is then bound to the slot selected by ShaderSlot. To perform an unbind, field Valid must be set to FALSE, and field ShaderSlot selects one of the binding slots. When a shader program performs a read operation from an unbound constant buffer slot, a zero value is always returned to the shader.

Figure 6:
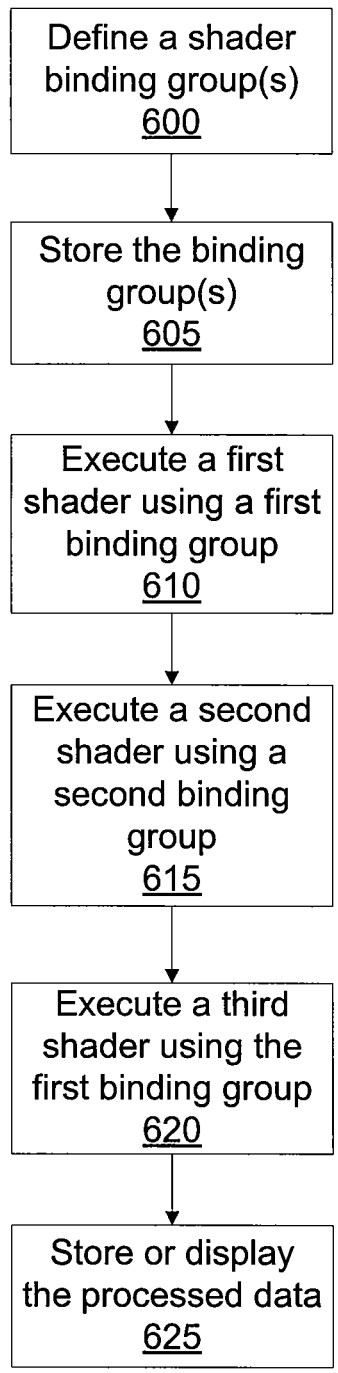
FIG. 6 is a flow diagram illustrating a method of sharing a binding group between two shaders, according to one embodiment of the present invention.

FIG. 6 is a flow diagram illustrating a method of sharing a binding group between two shaders, according to one embodiment of the present invention. At step 600 one or more shader binding groups are defined. In other words, a pointer for each binding group is defined and pointers are specified for one or more binding group slots in each binding group. At step 605 the binding group data is stored in binding group memory space. At step 610 a first shader program that references a first binding group is executed by a first shader, e.g., GPC 208 that is configured as a vertex, geometry, or fragment shader. At step 615 a second shader program that references a second binding group is executed by a second shader, e.g., GPC 208 that is configured as a vertex, geometry, or fragment shader. At step 620 a third shader program that references the first binding group is executed by a third shader, e.g., GPC 208 that is configured as a vertex, geometry, or fragment shader, to produce processed data. At step 625 the processed data is stored and/or displayed. Note that one or more of the first, second, and third shader may be the same GPC 208. Similarly, one or more of the first, second, and third shader program may be the same shader program.

A system and method for sharing binding groups between shaders allows for efficient use of shader state data storage resources. In contrast with conventional graphics processors and Application Programming Interfaces that specify only one binding group for each shader, two or more shaders may reference the same binding group. As the number and variety of different shaders increases, the number of binding groups may increase at a different rate since some binding groups may be shared between different shaders. The binding group data may be stored in a cache within each GPC 208, within a shared storage resource within a PPU 202, and/or in graphics memory. The binding group pointer referenced by a particular shader program may be stored within the GPC 208 that is configured to execute the particular shader program.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for sharing a binding group, the method comprising:
    generating a first binding group of shader state data, wherein the first binding group includes a number of binding slots and a pointer to a texture header binding slot, each binding slot storing a pointer to a location in a memory storing a portion of the shader state data;
    configuring a first shader program to reference the first binding group, and further comprising storing a pointer to the first binding group in a first shader processing unit that is configured to execute the first shader program;
    configuring a second shader program to reference the first binding group; and
    processing graphics data by executing the first shader program and the second shader program to produce processed graphics data that is stored in a memory or displayed on a display device.

2. The method of claim 1, wherein the first binding group includes a number of binding slots, each binding slot storing a pointer to texture sampler shader state data.

3. The method of claim 1, wherein the first binding group includes a number of binding slots, each binding slot storing a pointer to texture header shader state data.

4. The method of claim 1, wherein the first binding group includes a number of binding slots, each binding slot storing a pointer to constant buffer shader state data.

5. The method of claim 1, further comprising the step of storing the first binding group in a cache memory within a first shader processing unit that is configured to execute the first shader program.

6. The method of claim 1, further comprising the steps of:
    generating a second binding group of shader state data; and
    configuring a third shader program to reference the second binding group.

7. The method of claim 1, wherein the first binding group further includes a pointer to a constant buffer binding slot.

8. The method of claim 1, wherein the first binding group further includes a pointer to a texture sampler binding slot.

9. A non-transitory computer readable medium storing instructions that, when executed by a processor, cause the processor to share a binding group, by performing the steps of:

generating a first binding group of shader state data, wherein the first binding group includes a number of binding slots and a pointer to a texture header binding slot, each binding slot storing a pointer to a location in a memory storing a portion of the shader state data;

configuring a first shader program to reference the first binding group, and further comprising storing a pointer to the first binding group in a first shader processing unit that is configured to execute the first shader program;

configuring a second shader program to reference the first binding group; and processing graphics data by executing the first shader program and the second shader program to produce processed graphics data that is stored in a memory or displayed on a display device.

10. The non-transitory computer readable medium of claim 9, wherein the first binding group includes a number of binding slots, each binding slot storing a pointer to texture sampler shader state data.

11. The non-transitory computer readable medium of claim 9, wherein the first binding group includes a number of binding slots, each binding slot storing a pointer to texture header shader state data.

12. The non-transitory computer readable medium of claim 9, wherein the first binding group further includes a pointer to a constant buffer binding slot.

13. The non-transitory computer readable medium of claim 9, wherein the first binding group further includes a pointer to a texture sampler binding slot.

14. A system for sharing a binding group, the system comprising:

a processor configured to:

generate a first binding group of shader state data, wherein the first binding group includes a number of binding slots and a pointer to a texture header binding slot, each binding slot storing a pointer to a location in a memory storing a portion of the shader state data;

configure a first shader program to reference the first binding group, and further comprising storing a pointer to the first binding group in a first shader processing unit that is configured to execute the first shader program;

configure a second shader program to reference the first binding group; and process graphics data by executing the first shader program and the second shader program to produce processed graphics data that is stored in a memory or displayed on a display device.

15. The system of claim 14, further comprising a memory storing instructions that, when executed by the processor, configure the processor to:

generate the first binding group of shader state data;

configure the first shader program to reference the first binding group;

configure the second shader program to reference the first binding group; and process the graphics data to produce the processed graphics data that is stored in the memory or displayed on the display device.

16. The system of claim 15, further comprising configuring the processor to store the first binding group in a cache memory within a first shader processing unit that is configured to execute the first shader program.

17. The system of claim 15, further comprising configuring the processor to:

generate a second binding group of shader state data; and configure a third shader program to reference the second binding group.

18. The system of claim 15, further comprising a device driver configured to configure a private binding slot in the first binding group.

19. The system of claim 14, wherein the first binding group further includes a pointer to a constant buffer binding slot.

20. The system of claim 14, wherein the first binding group further includes a pointer to a texture sampler binding slot.

* * * * *